United States Patent
Kim et al.

(10) Patent No.: US 12,424,647 B2
(45) Date of Patent: *Sep. 23, 2025

(54) RADICAL SCAVENGER, METHOD FOR PREPARING SAME, AND MEMBRANE-ELECTRODE ASSEMBLY CONTAINING SAME

(71) Applicants: KOLON INDUSTRIES, INC., Seoul (KR); KOREA ADVANCED INSTITUTE OF SCIENCE AND TECHNOLOGY, Daejeon (KR)

(72) Inventors: Hee-Tak Kim, Daejeon (KR); Seongmin Yuk, Daejeon (KR); Dong Wook Lee, Daejeon (KR); Kah-Young Song, Seoul (KR); Jun Young Kim, Seoul (KR)

(73) Assignees: KOLON INDUSTRIES, INC, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 759 days.

This patent is subject to a terminal disclaimer.

(21) Appl. No.: 17/607,408

(22) PCT Filed: May 8, 2020

(86) PCT No.: PCT/KR2020/006088
§ 371 (c)(1),
(2) Date: Oct. 29, 2021

(87) PCT Pub. No.: WO2020/226449
PCT Pub. Date: Nov. 12, 2020

(65) Prior Publication Data
US 2022/0209271 A1    Jun. 30, 2022

(30) Foreign Application Priority Data
May 8, 2019    (KR) .................. 10-2019-0053447

(51) Int. Cl.
*H01M 8/1051*    (2016.01)
*H01M 4/86*    (2006.01)
(Continued)

(52) U.S. Cl.
CPC ....... *H01M 8/1051* (2013.01); *H01M 4/8663* (2013.01); *H01M 8/1004* (2013.01); *H01M 2008/1095* (2013.01)

(58) Field of Classification Search
CPC ............ H01M 8/1051; H01M 4/8663; H01M 8/1004; H01M 2008/1095; H01M 8/1018; H01M 8/1053; Y02E 60/50; Y02P 70/50
See application file for complete search history.

(56) References Cited

U.S. PATENT DOCUMENTS

| 4,562,050 A | * | 12/1985 | Koeda ................. C01B 21/064 501/96.4 |
| 8,722,569 B2 | | 5/2014 | Siddiqui |
| 2016/0240865 A1 | | 8/2016 | Hirano |

FOREIGN PATENT DOCUMENTS

| CN | 104470852 A | 3/2015 |
| CN | 109671965 A | 4/2019 |

(Continued)

OTHER PUBLICATIONS

Shi et al., Active Fe2O3 nanoparticles encapsulated in porous g-C3N4/graphene sandwich-type nanosheets as a superior anode for high-performance lithium-ion batteries, DOI: 10.1039/C6TA03533G (Paper) J. Mater. Chem. A, 2016, 4, 10666-10672.*

(Continued)

*Primary Examiner* — Helen Oi K Conley
(74) *Attorney, Agent, or Firm* — Harvest IP Law, LLP

(57) ABSTRACT

Disclosed are a radical scavenger, a method for preparing same, and a membrane-electrode assembly containing same, wherein the radical scavenger can maintain the performance (Continued)

of a fuel cell for a long time and enhance the lifespan thereof since the elution of metal ions derived from radical scavenging particles during fuel cell operation can be continuously prevented for a long time. The radical scavenger of the present invention comprises: radical scavenging particles; and a porous protective film on the surface of the radical scavenging particles, wherein the porous protective film comprises at least one material of high oxidative stability selected from the group consisting of silica, carbon nitride, heteroatom-doped graphene, a porphyrin-based compound, a phenazine-based compound, and derivatives thereof.

16 Claims, 7 Drawing Sheets

(51) Int. Cl.
*H01M 8/10* (2016.01)
*H01M 8/1004* (2016.01)

(56) References Cited

FOREIGN PATENT DOCUMENTS

| JP | 2007242423 A | 9/2007 |
|---|---|---|
| JP | 2015511876 A | 4/2015 |
| KR | 20180000025 A | 1/2018 |
| KR | 20180003906 A | 1/2018 |
| KR | 20180078162 A | 7/2018 |
| KR | 20190037674 A | 4/2019 |
| WO | 2013100346 A1 | 7/2013 |
| WO | 2019013373 A1 | 1/2019 |

OTHER PUBLICATIONS

Ding et al., Synthesis of Transition Metal-Modified Carbon Nitride Polymers for Selective Hydrocarbon Oxidation, First published: Sep. 24, 2010 https://doi.org/10.1002/cssc.201000149Citations: 376.*
Gong et al. (Graphitic carbon nitride polymers: promising catalysts or catalyst supports for heterogeneous oxidation and hydrogenation, DOI: 10.1039/C4GC01847H (Critical Review) Green Chem., 2015, 17, 715-736.*
The office action dated Sep. 23, 2023 related to the corresponding Chinese Patent application.
ACS Applied Materials & Interfaces, 2015, vol. 7, pp. 27539-27546.
Journal of Hazardous Materials, 2019, vol. 364, pp. 635-644.
KR office action dated Mar. 16, 2022.
JP office action dated Oct. 3, 2022.
Pal N et al: "Mn-doped ordered mesoporous ceria-silica composites and their catalytic properties toward biofuel production" dated Jul. 24, 2014.
European Search Report dated Oct. 25, 2024.

* cited by examiner (a)

(b)

(c)

RADICAL SCAVENGER, METHOD FOR PREPARING SAME, AND MEMBRANE-ELECTRODE ASSEMBLY CONTAINING SAME

CROSS REFERENCE TO RELATED APPLICATIONS

This application is a National Stage of International Application No. PCT/KR2020/006088 filed May 8, 2020, claiming priority based on Korean Patent Application No. 10-2019-0053447 filed May 8, 2019.

TECHNICAL FIELD

The present disclosure relates to a radical scavenger, a method for manufacturing the same, and a membrane-electrode assembly including the same. More particularly, the present disclosure relates to a radical scavenger that is capable of maintaining the performance of a fuel cell for a long time and improving the lifespan thereof by continuously preventing the migration of metal ions derived from radical-scavenging particles over a long period of time during the operation of the fuel cell, a method for manufacturing the same, and a membrane-electrode assembly including the same.

BACKGROUND ART

A polymer electrolyte membrane fuel cell (PEMFC), which generates electricity using a stacked structure of unit cells, each including a membrane-electrode assembly (MEA) and a separator (also referred to as a "bipolar plate"), is drawing attention as a next-generation energy source that can replace fossil energy due to the high energy efficiency and environmental friendliness thereof.

The membrane-electrode assembly generally includes an anode (also referred to as a "fuel electrode" or an "oxidization electrode"), a cathode (also referred to as an "air electrode" or a "reduction electrode") and a polymer electrolyte membrane interposed therebetween.

When fuel such as hydrogen gas is supplied to an anode, the hydrogen at the anode is oxidized to produce a proton ($H^+$) and an electron ($e^-$). The produced proton is transferred to the cathode through the polymer electrolyte membrane, whereas the generated electron is transferred to the cathode through an external circuit. At the cathode, to which air containing oxygen is supplied, the oxygen is reduced. That is, the oxygen is bonded to the proton and electron supplied from the anode to produce water.

The membrane-electrode assembly, especially the polymer electrolyte membrane, has a tremendous effect on the performance and lifespan of the polymer electrolyte membrane fuel cell. Therefore, preventing degradation of the polymer electrolyte membrane during operation of the fuel cell is very important for improving the performance and lifespan of the fuel cell.

It is known that radicals generated when a fuel cell is driven are a major cause of degradation of polymer electrolyte membranes. For example, hydrogen peroxide ($H_2O_2$) is produced during the reduction reaction of oxygen at the cathode, and hydrogen peroxide radicals ($HO_2 \cdot$) and/or hydroxyl radicals ($\cdot OH$) are produced from hydrogen peroxide ($H_2O_2$). In addition, when oxygen molecules in the air supplied to the cathode pass through the polymer electrolyte membrane and then reach the anode, hydrogen peroxide is also generated in the anode, thus creating hydrogen peroxide radicals and/or hydroxyl radicals. These radicals cause degradation of an ionomer (for example, a polymer having a sulfonic acid group) contained in the polymer electrolyte membrane, thus reducing the ion conductivity of the electrolyte membrane.

In order to prevent degradation of the polymer electrolyte membrane (more specifically, ionomer) by radicals, the introduction of a radical scavenger capable of removing the radicals has been suggested.

However, disadvantageously, the radical scavenger, dispersed in the electrolyte of membrane in the form of particles, migrates during operation of the fuel cell. That is, since the amount of the radical scavenger capable of removing radicals is reduced, as the driving time of the fuel cell increases, radical removal is performed increasingly poorly, resulting in a rapid deterioration of the fuel cell.

In addition, metal ions produced through ionization of the radical scavenger are migrated by water. Since these metal ions have a very high reduction potential, they oxidize the components of the electrode (for example, platinum and/or carbon), thus causing a deterioration in fuel cell performance.

More specifically, 1 mM $Ce(SO_4)_2$ was dissolved in a 1.5 M sulfuric acid solution to prepare a 1 mM $Ce^{4+}$ solution, 20 mg of a Pt/C powder wad added to 10 mL of the 1 mM $Ce^{4+}$ solution, and then $Ce^{4+}$ and Pt/C were allowed to react at 250 rpm at 80° C. for 50 hours while stirring. Subsequently, the Pt/C powder was separated by centrifugation (3,600 rpm, 10 minutes), and then a solution sample was extracted. As a result of measurement of the extracted solution sample at a wavelength of 1 nm within a wavelength range of 200 to 600 nm using UV-Vis spectroscopy, as can be seen from the graph of FIG. 1, reduction of $Ce^{4+}$ and production of $Pt^{2+}$ (i.e., platinum oxidation/degradation by $Ce^{4+}$) were detected.

Korean Patent Laid-open Publication No. 10-2019-003764A, filed by the present applicant, suggests that the migration of radical scavenger particles can be prevented by coating a solution containing a dopamine on the surface of the radical scavenger particles and then carbonizing the dopamine to form a surface coating layer to thereby reduce the mobility of the scavenger particles.

However, the prior art focuses only on preventing the migration of the radical scavenger particles and does not consider the migration of metal ions (e.g., $Ce^{3+/4+}$) generated through ionization of the radical scavenger, and any side effects caused thereby at all. Rather, the prior art teaches that the surface coating layer should have pores with a sufficiently large size so that metal ions generated through ionization of the radical scavenger can be discharged through the surface coating layer.

Moreover, since the material produced by carbonization of dopamine is not sufficiently high in oxidative stability to the metal ions, the surface coating layer is oxidized and degraded by the metal ions over time, causing selective permeability to be lost and resulting in a limitation in preventing even the migration of the radical scavenger particles intended by the prior art for a long time.

DISCLOSURE

Technical Problem

Therefore, it is one object of the present disclosure to provide a radical scavenger, a method for manufacturing the same and a membrane-electrode assembly including the same that are capable of overcoming problems caused by the limitations and drawbacks of the related art described above.

It is another object of the present disclosure to provide a radical scavenger that is capable of maintaining the performance of a fuel cell for a long time and improving the lifespan thereof by continuously preventing the migration of metal ions derived from radical-scavenging particles over a long period of time during the operation of the fuel cell.

It is another object of the present disclosure to provide a method for manufacturing a radical scavenger that is capable of maintaining the performance of a fuel cell for a long time and improving the lifespan thereof by continuously preventing the migration of metal ions derived from radical-scavenging particles over a long period of time during the operation of the fuel cell.

It is another object of the present disclosure to provide a membrane-electrode assembly including a radical scavenger that is capable of maintaining the performance of a fuel cell for a long time and improving the lifespan thereof by continuously preventing the migration of metal ions derived from radical-scavenging particles over a long period of time during the operation of the fuel cell.

In addition to the aspects of the present disclosure described above, other features and advantages of the present disclosure will be described in the following detailed description or be more clearly understood by those skilled in the art to which the present disclosure pertains.

Technical Solution

In accordance with one aspect of the present disclosure to solve the technical problems, provided is a radical scavenger including a radical-scavenging particle, and a porous protective film over a surface of the radical-scavenging particle, wherein the porous protective film includes at least one material of high oxidative stability selected from the group consisting of silica, carbon nitride, heteroatom-doped graphene, a porphyrin-based compound, a phenazine-based compound and derivatives thereof, wherein the heteroatom is selected from the group consisting of N, S, P, B and F.

The radical-scavenging particle may include at least one selected from the group consisting of a transition metal, a noble metal, an ion thereof, a salt thereof, an oxide thereof, a nitride thereof and a complex thereof.

The porous protective film may include carbon nitride or a derivative thereof.

The porous protective film may include graphitic carbon nitride or a derivative thereof, and the graphitic carbon nitride may be $g\text{-}C_3N_4$ or $g\text{-}C_2N$.

The porous protective film may have a thickness of 0.5 to 50 nm.

In accordance with another aspect of the present disclosure, provided is a method for manufacturing a radical scavenger including forming a precursor layer including at least one precursor selected from the group consisting of a silica precursor and a carbon nitride precursor over a surface of a radical-scavenging particle, and converting the precursor layer into a porous protective film.

The precursor layer may include at least one silica precursor selected from the group consisting of tetraethyl orthosilicate, tetramethoxysilane, (3-mercaptopropyl)triethoxysilane, and silicon tetrachloride.

The precursor layer may include at least one carbon nitride precursor selected from the group consisting of cyanamide, dicyandiamide, urea, melamine, polymelamine and a polymelamine-formaldehyde copolymer.

The precursor layer may include dicyandiamide.

The forming the precursor layer may include preparing a precursor solution including the at least one precursor selected from the group consisting of a silica precursor and a carbon nitride precursor, applying the precursor solution to the surface of the radical-scavenging particle, and removing a solvent from the precursor solution applied to the surface of the radical-scavenging particle.

The precursor solution may include at least one solvent selected from the group consisting of water, cyclohexane, hexane, dimethylacetamide (DMA), dimethyl sulfoxide (DMSO), dimethylformamide (DMF), and methylpyrrolidone.

The applying may include submerging the radical-scavenging particle in the precursor solution, stirring the precursor solution containing the radical-scavenging particle, and then performing centrifugation.

The removing the solvent may include drying the precursor solution applied to the surface of the radical-scavenging particle.

The converting the precursor layer into the porous protective layer may include heat-treating the precursor layer.

In accordance with another aspect of the present disclosure, provided is a membrane-electrode assembly including an anode, a cathode, a polymer electrolyte membrane between the anode and the cathode, and the radical scavengers described above.

At least a portion of the radical scavengers may be disposed (i) inside the anode at a surface of the anode facing the polymer electrolyte membrane, (ii) inside the cathode at a surface of the cathode facing the polymer electrolyte membrane, (iii) inside the polymer electrolyte membrane at a surface of the polymer electrolyte membrane facing the anode, (iv) inside the polymer electrolyte membrane at a surface of the polymer electrolyte membrane facing the cathode, (v) between the anode and the polymer electrolyte membrane, or (vi) between the cathode and the polymer electrolyte membrane.

The membrane-electrode assembly may further include an interfacial bonding layer between the anode and the polymer electrolyte membrane, wherein at least a portion of the radical scavengers are disposed in the interfacial bonding layer.

The membrane-electrode assembly may further include an interfacial bonding layer between the cathode and the polymer electrolyte membrane, wherein at least a portion of the radical scavengers are disposed in the interfacial bonding layer.

The general description of the present disclosure as described above is only for illustration or description of the present disclosure and does not limit the scope of the present disclosure.

Advantageous Effects

According to the present disclosure, the mobility of radical scavengers can be reduced and the migration can thus be inhibited by forming a porous protective film on the surface of the radical-scavenging particles, and the degradation of the protective film due to metal ions generated by ionization of the radical-scavenging particles can be prevented by forming the porous protective film using a material having high oxidative stability such as silica or carbon nitride.

As a result, according to the present disclosure, the migration of the radical scavenger during fuel cell operation can be continuously prevented for a long time, and the migration of metal ions generated therefrom can also be continuously prevented for a long period of time. Therefore, the performance of the fuel cell can be maintained for a long period of time and the lifespan of the fuel cell can be significantly improved without chemical deterioration of the electrolyte membrane and/or electrode due to the metal ions generated through ionization of radicals or radical scavengers generated during the operation of the fuel cell.

DESCRIPTION OF DRAWINGS

The accompanying drawings, which are provided for better understanding of the present disclosure and constitute a part of the present specification, are given to exemplify the embodiments of the present disclosure and describe the principles and features of the present disclosure with reference to the following detailed description, in which.

BEST MODE

Hereinafter, preferred embodiments of the present disclosure will be described in more detail. The embodiments are provided only for illustration and should not be construed as limiting the scope of the present disclosure.

Figure 1:
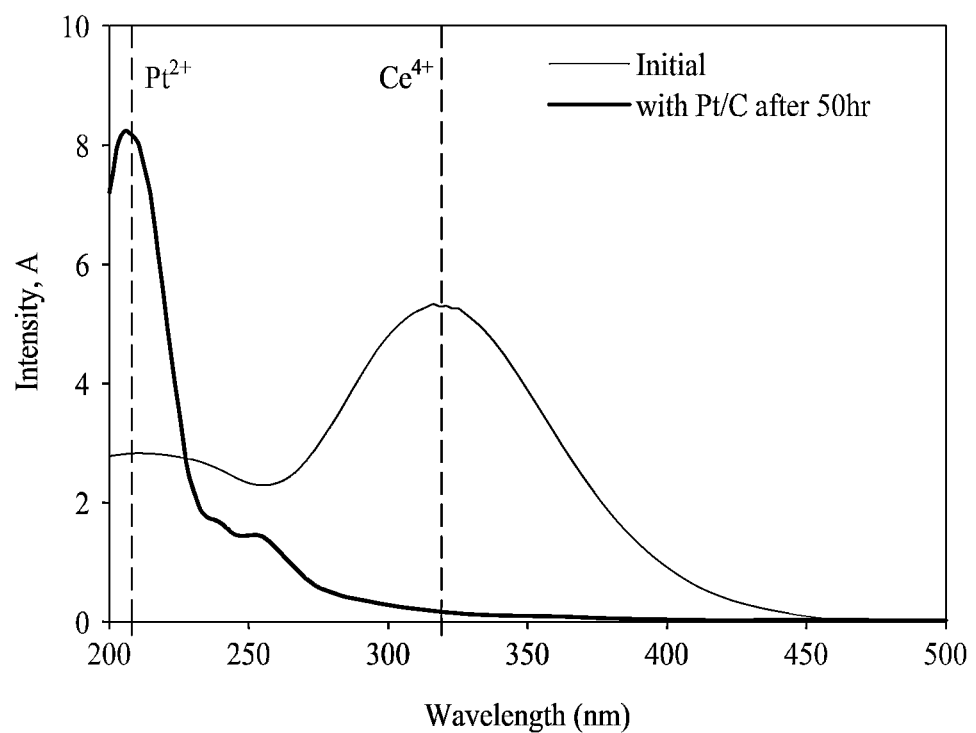
FIG. 1 is a graph showing oxidation/degradation of platinum (Pt) by Ce ions.
Figure 2:
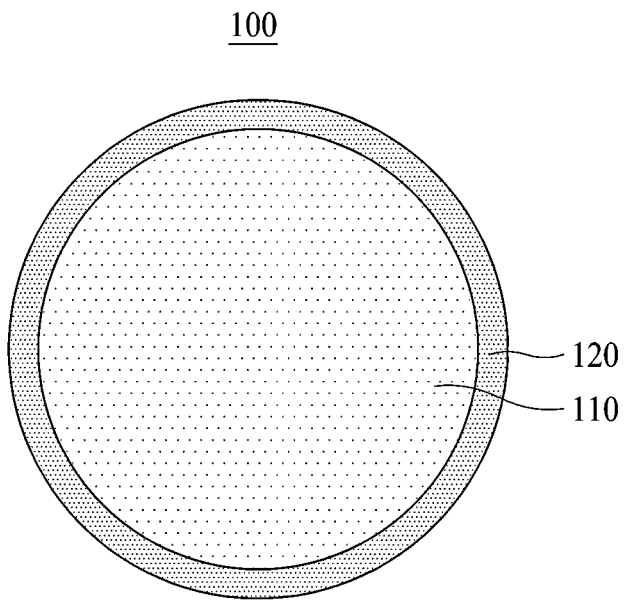
FIG. 2 schematically shows a radical scavenger of the present disclosure.

As shown in FIG. 2, the radical scavenger 100 of the present disclosure includes a radical-scavenging particle 110 and a porous protective film 120 on the surface of the radical-scavenging particle 110.

The radical-scavenging particle 110 is capable of removing hydrogen peroxide radicals and/or hydroxyl radicals that cause degradation of the electrolyte membrane and deteriorate the ionic conductivity thereof, and may include at least one selected from the group consisting of a transition metal, a noble metal, an ion thereof, a salt thereof, an oxide thereof, a nitride thereof and a complex thereof.

The transition metal may be cerium (Ce), manganese (Mn), tungsten (W), cobalt (Co), vanadium (V), nickel (Ni), chromium (Cr), zirconium (Zr), yttrium (Y), iridium (Ir), iron (Fe), titanium (Ti), molybdenum (Mo), lanthanum (La), or neodymium (Nd), but the present disclosure is not limited thereto.

The noble metal may be silver (Au), platinum (Pt), ruthenium (Ru), palladium (Pd) or rhodium (Rh), but the present disclosure is not limited thereto.

In addition, the salt of the transition metal or the noble metal may be carbonate, acetate, chloride, fluoride, sulfate, phosphate, nitrate, tungstate, hydroxide, ammonium acetate, ammonium sulfate or acetylacetonate of the transition metal or the noble metal, but the present disclosure is not limited thereto.

The porous protective film 120 of the present disclosure includes at least one material of high oxidative stability that is selected from the group consisting of silica, carbon nitride, heteroatom-doped graphene (wherein the heteroatom is N, S, P, B and/or F), a porphyrin-based compound, a phenazine-based compound and derivatives thereof. For example, the porous protective film 120 according to an embodiment of the present disclosure may include carbon nitride or a derivative thereof, and more specifically graphitic carbon nitride (g-$C_3N_4$ or g-$C_2N$) or a derivative thereof.

The porous protective layer 120 can prevent the migration of the radical-scavenging particle 110 by reducing the mobility of the radical-scavenging particle 110.

The ion of the transition metal or the noble metal (hereinafter, referred to as a "metal ion") has a considerably high reduction potential, thus having a high possibility of causing oxidation and degradation of the porous protective layer 120. Therefore, according to the present disclosure, the porous protective film 120 contains silica and/or carbon nitride, which is a material having high oxidative stability to the metal ion, thereby continuously preventing the migration of the metal ion for a long period of time without deterioration due to the metal ion, and resulting in maintenance of performance of the fuel cell for a long period of time and significant improvement of the lifespan thereof without chemical deterioration of the electrolyte membrane and/or electrode due to the metal ion.

Figure 3:
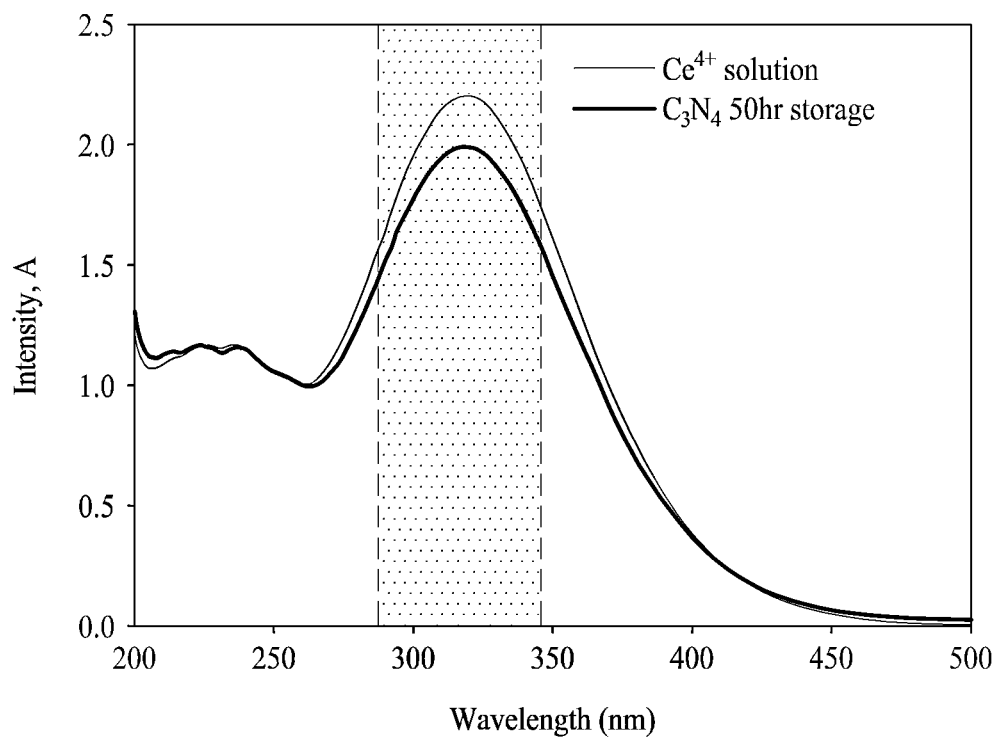
FIG. 3 is a graph showing the high oxidation stability of $C_3N_4$ to Ce ions.

For example, 20 mg of a dicyandiamide powder was heat-treated at 550° C. for 4 hours under an $N_2$ atmosphere to prepare a $C_3N_4$ powder. In addition, 1 mM Ce$(SO_4)_2$ was dissolved in a 1.5 M sulfuric acid solution to prepare a 1 mM $Ce^{4+}$ solution. The $C_3N_4$ powder was added to the 1 mM $Ce^{4+}$ solution, followed by stirring at 80° C. at 250 rpm for 50 hours. Subsequently, the $C_3N_4$ powder was separated through centrifugation (3,600 rpm, 10 minutes), and then a solution sample was extracted. As a result of measuring the extracted solution sample using UV-Vis spectroscopy at a wavelength of 200 to 600 nm at 1 nm intervals, it was observed that the concentration of Ce ions ($Ce^{4+}$) hardly changed, as can be seen from the graph of FIG. 3. This demonstrates the high oxidation stability of g-$C_3N_4$ to Ce ions ($Ce^{4+}$).

According to an embodiment of the present disclosure, the average pore diameter of the porous protective film 120 is larger than 0.22 nm, which is the radius of hydroxyl radicals, but is smaller than the size of the metal ion derived from the radical-scavenging particle 110. For example, when the metal ion generated by ionization of the radical-scavenging particle 110 is a Ce ion ($Ce^{3+/4+}$), the average pore size of the porous protective film 120 exceeds 0.22 nm and is smaller than 0.45 nm, which is smaller than the size of the Ce ion ($Ce^{3+/4+}$).

Therefore, the porous protective film 120 according to an embodiment of the present disclosure is selectively permeable, thus enabling hydroxyl radicals to pass therethrough but preventing metal ions from passing therethrough, effectively preventing the migration of metal ions without deterioration in the radical-scavenging performance of the radical scavenger 100. As a result, the performance of the fuel cell can be maintained for a long period of time, and the life of the metal can be significantly improved without chemical deterioration of the electrolyte membrane and/or electrode due to the metal ions.

According to an embodiment of the present disclosure, the porous protective film 120 has a thickness of 0.5 to 50 nm, more preferably 0.5 to 10 nm, even more preferably 0.05 to 2 nm. As the thickness increases, the average pore size of the porous protective film 120 decreases.

Figure 4:
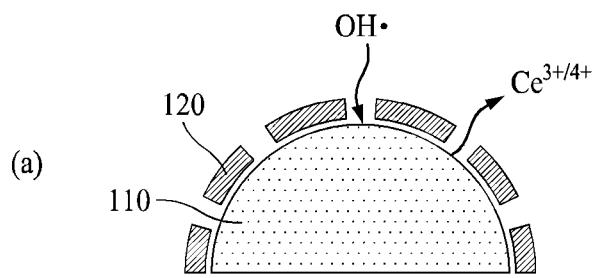
FIGS. 4A to 4C schematically show the relationship between the thickness, the average pore size and the selective permeability of a porous protective film.
Figure 4:
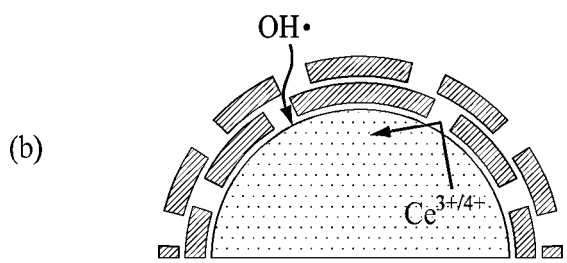
Figure 4:
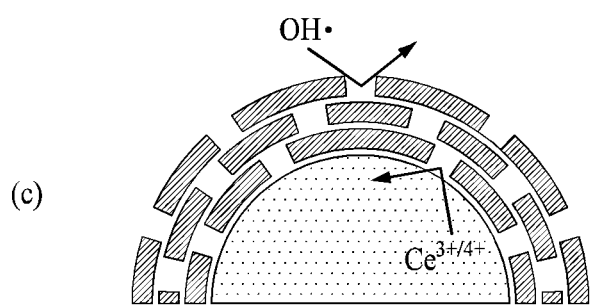

FIGS. 4A to 4C schematically show the relationship between the thickness, the average pore size and the selective permeability of a porous protective film 120.

As shown in FIG. 4(a), when the porous protective film 120 is excessively thin, the average pore size thereof is excessively large, causing migration of metal ions (Ce ions ($Ce^{3+/4+}$)). On the other hand, as shown in FIG. 4(c), when the porous protective film 120 is excessively thick, it does not allow metal ions [Ce ions ($Ce^{3+/4+}$)] or radicals (OH·) to pass therethrough, and thus cannot perform the inherent function of removing radicals. Therefore, as shown in FIG. 4(b), it is important for the porous protective film 120 to have an average pore size capable of ensuring selective permeability by appropriately controlling the thickness of the porous protective film 120.

Hereinafter, a method for manufacturing a silica scavenger 100 of the present disclosure will be described in detail.

The method of the present disclosure includes forming a precursor layer containing at least one precursor selected from the group consisting of a silica precursor and a carbon nitride precursor on the surface of the radical-scavenging particle 110 and converting the precursor layer into the porous protective film 120.

The silica precursor may be, but is not limited to, tetraethyl orthosilicate, tetramethoxysilane, (3-mercaptopropyl) triethoxysilane, or silicon tetrachloride. That is, the precursor layer may include at least one silica precursor selected from the group consisting of tetraethyl orthosilicate, tetramethoxysilane, (3-mercaptopropyl)triethoxysilane, and silicon tetrachloride.

The carbon nitride precursor may be, but is not limited to, cyanamide, dicyandiamide, urea, melamine, polymelamine or a polymelamine-formaldehyde copolymer. That is, the precursor layer may include at least one carbon nitride precursor selected from the group consisting of cyanamide, dicyandiamide, urea, melamine, polymelamine and polymelamine-formaldehyde copolymers.

According to one embodiment of the present disclosure, the precursor layer includes dicyandiamide.

According to an embodiment of the present disclosure, the forming the precursor layer includes preparing a precursor solution containing the at least one precursor selected from the group consisting of a silica precursor and a carbon nitride precursor, applying the precursor solution to the surface of the radical-scavenging particle 110 and removing a solvent from the precursor solution applied to the surface of the radical-scavenging particle 110.

The precursor solution may include at least one solvent selected from the group consisting of water, cyclohexane, hexane, dimethylacetamide (DMA), dimethyl sulfoxide (DMSO), dimethylformamide (DMF), and methylpyrrolidone.

The concentration of the precursor in the solution may be 0.01 to 50% by weight. By adjusting the concentration of the precursor, the thickness and average pore size of the porous protective film 120 formed on the surface of the radical-scavenging particle 110 can be controlled.

According to one embodiment of the present embodiment, the applying may include submerging the radical-scavenging particle 110 in the precursor solution, stirring the precursor solution containing the radical-scavenging particle 110, and performing centrifugation.

According to an embodiment of the present disclosure, the radical-scavenging particle 110 added to the precursor solution may be an oxide, nitride, salt, complex or mixture of the transition metal or noble metal described above, and 0.1 to 30 parts by weight of the radical-scavenging particle 110 with respect to 100 parts by weight of the precursor contained in the precursor solution may be added to the precursor solution. The thickness and average pore size of the porous protective film 120 formed on the surface of the radical-scavenging particle 110 can be controlled by adjusting the amount of the radical-scavenging particle 110.

The stirring may be performed at 100 to 500 rpm at 0° C. to 80° C. for 10 minutes to 2 days, and more specifically at 200 to 300 rpm at 20° C. to 40° C. for 8 to 16 hours. When the stirring is performed at a temperature less than 0° C., for a time shorter than 10 minutes, or at a rate less than 100 rpm, coating unevenness may occur or the coating may be excessively thin. On the other hand, the coating may be excessively thick when the stirring is performed at a temperature higher than 80° C. or for a time longer than 2 days.

The centrifugation, as an optional process, may be performed at 2,000 to 4,000 rpm.

The removing the solvent may include drying the precursor solution applied to the surface of the radical-scavenging particle 110. The drying may be performed at 40° C. to 80° C. for 12 to 24 hours.

The converting the precursor layer into the porous protective layer 120 may include heat-treating the precursor layer. The heat-treating may be performed under a nitrogen or argon atmosphere at 300° C. to 700° C. for 3 to 6 hours.

Immediately after the heat-treatment, ordinary acid cleaning (for example, adding to 0.1 to 3 M sulfuric acid at 50 to 90° C. and then performing stirring at 200 to 300 rpm for 1 to 5 hours), rinsing using distilled water and drying may be sequentially performed in order to remove impurities adsorbed on the porous protective film 120.

Hereinafter, embodiments of the membrane-electrode assembly of the present disclosure will be described in detail with reference to FIGS. 5 and 6.

Figure 5:
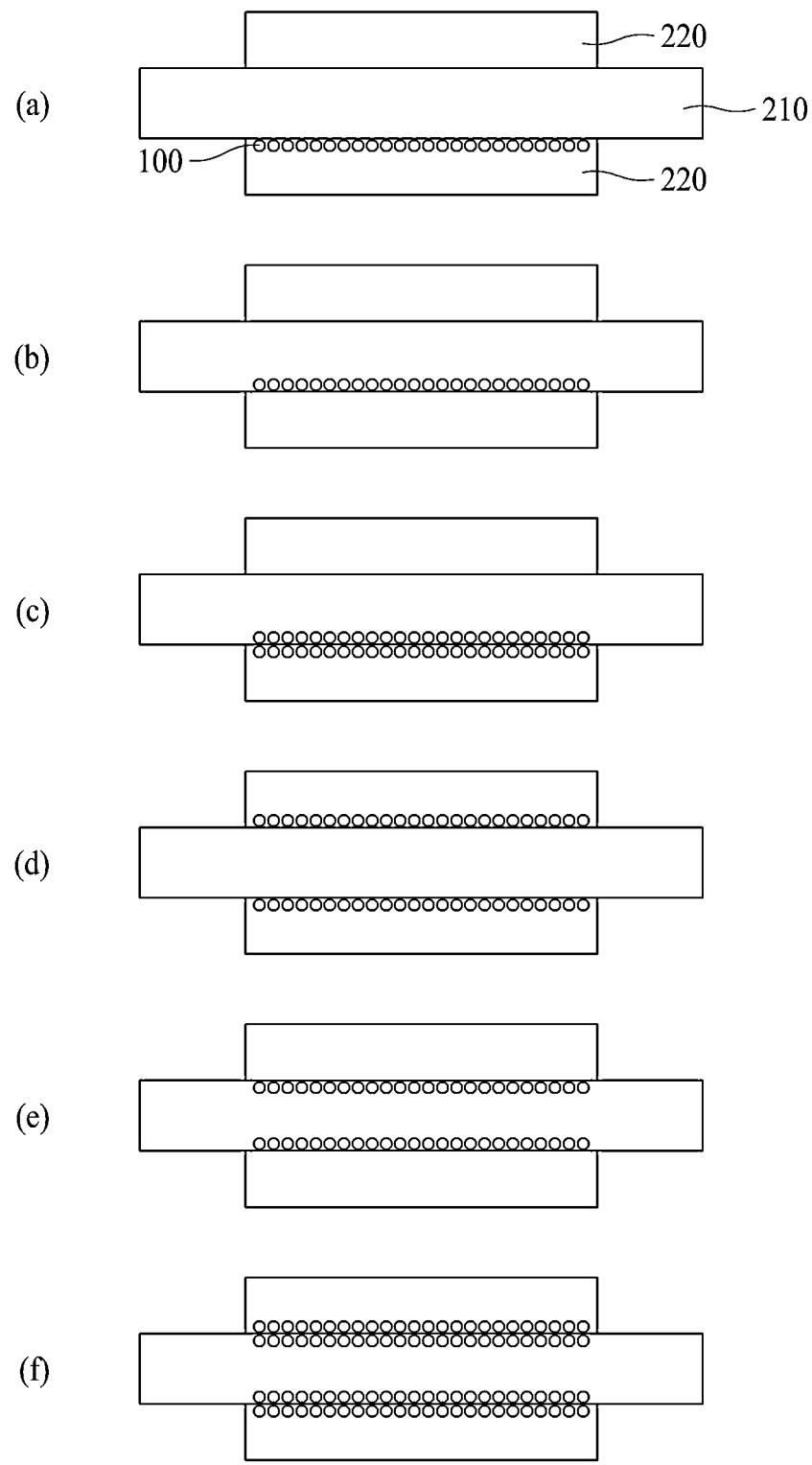
FIGS. 5A to 5F are cross-sectional views of a membrane-electrode assembly showing various examples in which the radical scavenger of the present disclosure is disposed in a membrane-electrode assembly having a structure according to an embodiment of the present disclosure.

As shown in FIG. 5, the membrane-electrode assembly of the present disclosure includes two electrodes 220 (i.e., an anode and a cathode), a polymer electrolyte membrane 210 therebetween, and a radical scavenger 100 of the present disclosure.

The electrodes 220 (also referred to as "catalyst layers") include a catalyst particle. As the catalyst particle, any catalyst particle may be used, so long as it can be used for the oxidation reaction of hydrogen and/or the reduction reaction of oxygen, and preferred is a platinum-based metal particle. When a catalyst particle is supported on a support, the catalyst particle may be located on the surface of the support or may penetrate into the support while filling the pores in the support. The support may be a carbon-based support, a porous inorganic oxide such as zirconia, alumina, titania, silica or ceria, or zeolite. The electrodes 220 may further include a binder to improve adhesion and transfer hydrogen ions. It is preferable to use an ionomer having ion conductivity as the binder.

Meanwhile, the polymer electrolyte membrane 210 may be (i) an ion-conductor-type single membrane, or (ii) a strengthening membrane including a porous support and an ion conductor impregnated in the porous support. The porous support may be a fluorine-based porous support such as e-PTFE or a porous nanoweb support produced by electrospinning. The ion conductor may be a cation conductor having a cation exchange group or an anion conductor having an anion exchange group.

As shown in FIG. 5(a), at least a portion of the radical scavengers 100 of the present disclosure may be disposed inside any one of the electrodes 220 and adjacent to a surface facing the polymer electrolyte membrane 210. The electrode 220 including the radical scavengers 100 disposed therein may be an anode or a cathode, and in particular, a cathode in which more radicals are generated.

For the embodiment of FIG. 5(a), (i) the radical scavenger 100 is added to a composition for forming the electrode containing a catalyst particle and a binder, and then the electrode 220 is produced using the composition thus obtained, or (ii) once the electrode 220 is formed, a solution containing the radical scavenger 100 is impregnated into the electrode 220.

According to the embodiment shown in FIG. 5(a), radicals generated at the electrode 220 may be removed by the radical scavengers 100 of the present disclosure immediately before being added to the polymer electrolyte membrane 210. Therefore, deterioration of the polymer electrolyte membrane 210 due to radicals can be prevented.

As shown in FIG. 5(b), at least a portion of the radical scavengers 100 of the present disclosure may be disposed inside any one of the electrodes 220 and adjacent to the surface facing the polymer electrolyte membrane 210. The electrode 220 facing the surface of the polymer electrolyte membrane 210, adjacent to which the radical scavengers 100 are disposed, may be an anode or a cathode, and in particular, a cathode, in which more radicals are generated.

For the embodiment of FIG. 5(b), (i) the radical scavenger 100 is added to a composition for forming the electrolyte membrane containing an ion conductor, and then the polymer electrolyte membrane 210 is produced using the composition thus obtained, or (ii) the polymer electrolyte membrane 210 is impregnated with a solution containing the radical scavenger 100.

According to the embodiment shown in FIG. 5(b), radicals generated at the electrode 220 may be removed by the radical scavengers 100 of the present disclosure immediately before being added to the polymer electrolyte membrane 210. Therefore, the degradation of the polymer electrolyte membrane 210 due to radicals can be prevented.

Various combinations of the embodiment of FIG. 5(a) and the embodiment of FIG. 5(b) are shown in FIGS. 5(c) to 5(f), respectively. In addition, it should be understood that various combinations other than these combinations are also conceivable and also fall within the scope of the present disclosure.

For example, the solution containing the radical scavenger 100 is applied to the surface of the polymer electrolyte membrane 210 and/or the surface of the electrode 220 and is then dried, so that the radical scavenger 100 can be disposed between the polymer electrolyte membrane 210 and the electrode 220.

Figure 6:
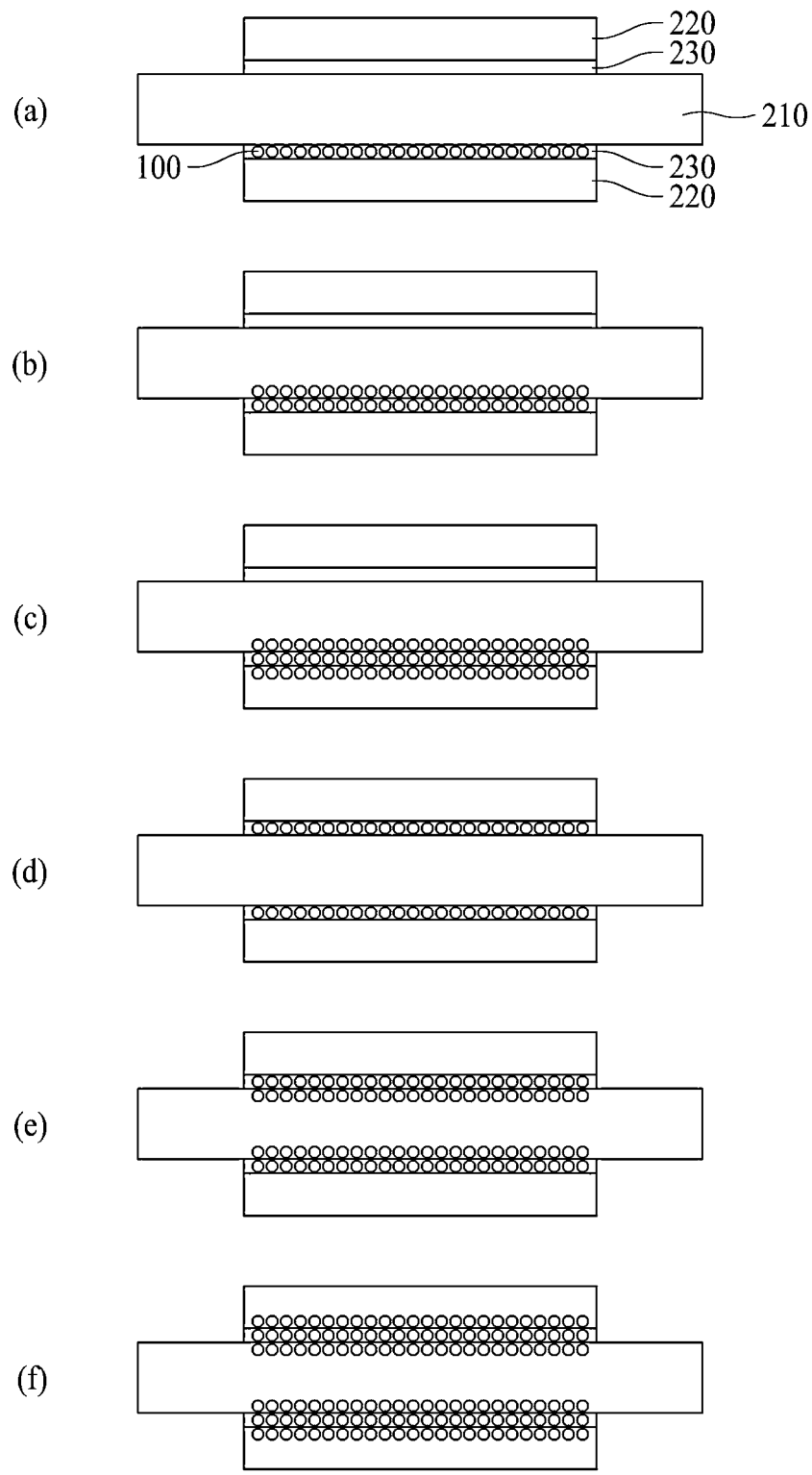
FIGS. 6A to 6F are cross-sectional views illustrating a membrane-electrode assembly showing various examples in which the radical scavenger of the present disclosure is disposed in a membrane-electrode assembly having a structure according to another embodiment of the present disclosure.

As shown in FIG. 6, the membrane-electrode assembly of the present disclosure may further include an interface bonding layer 230 between each electrode 220 and the polymer electrolyte membrane 210, wherein at least a portion of the scavengers 100 may be present in the interface bonding layer 230.

The interfacial bonding layer 230 including an ionomer imparts low hydrogen permeability to the membrane-electrode assembly without deterioration of ionic conductivity, and improves the interfacial bonding property between the electrode 220 and the electrolyte membrane 210, thereby improving the durability of the membrane-electrode assembly.

The ionomer included in the interfacial bonding layers 230 may have an equivalent weight (EW) of 1,100 g/eq or less, and specifically 500 g/eq to 1,100 g/eq. The equivalent weight of the ionomer is the molecular mass of the ionomer per ion exchange group present in the ionomer.

The interfacial bonding layer 230 can have a positive effect on water management of the membrane-electrode assembly under low-humidity conditions by controlling the equivalent amount of the ionomer. When an ionomer having the equivalent amount is used, the performance of the membrane-electrode assembly can be improved without deteriorating the conductivity of hydrogen ions. Meanwhile, when the equivalent weight of the ionomer is less than 500 g/eq, migration of the ionomer or the permeability of hydrogen fuel may increase, and when the equivalent weight of the ionomer exceeds 1,100 g/eq, the hydrogen ion conductivity may be deteriorated under high-temperature and low-humidity conditions.

The ionomer included in the interfacial bonding layer 230 may be any one selected from the group consisting of fluorine-based ionomers, hydrocarbon-based ionomers and mixtures thereof.

FIG. 6 shows an embodiment wherein the interfacial bonding layer 230 is disposed on both surfaces of the electrolyte membrane 210, but the present disclosure is not limited thereto, and the interfacial bonding layer 230 may be disposed only on one surface of the electrolyte membrane 210.

As shown in FIG. 6(a), at least a portion of the radical scavengers 100 of the present disclosure may be disposed in the interfacial bonding layer 230 located between any one of the electrodes 220 (anode or cathode, preferably cathode, in which more radicals are produced) and the polymer electrolyte membrane 210.

The forming the interfacial bonding layer 230 including the radical scavenger 100 may include mixing the radical scavenger 100 with the ionomer to prepare a composition for forming an interfacial bonding layer, applying the composition for forming to the surface of the electrolyte membrane 210 or the electrode 220, and drying the result.

The composition for forming the interfacial bonding layer may be prepared by adding the radical scavenger 100 and the ionomer to a solvent, followed by mixing.

The composition for forming the interfacial bonding layer may include the ionomer at a concentration of 0.1% to 30%, preferably 1% to 10%. When the composition for forming the interfacial bonding layer includes the ionomer in the above concentration range, hydrogen ion conductivity and interfacial bonding may be improved without increasing the interfacial resistance of the membrane-electrode assembly. When the concentration of the ionomer is less than 0.1%, the hydrogen ion transfer ability may be lowered, and when the concentration exceeds 30%, the ionomer distribution may be non-uniform.

The composition for forming the interfacial bonding layer may include the radical scavenger 100 at a concentration of 0.1% to 70% by weight, preferably 5% to 15% by weight. When the content of the radical scavenger 100 is lower than 0.1% by weight, the effect of improving chemical durability may be insufficient. When the content exceeds 70% by weight, the ion transfer resistance of the membrane-electrode assembly can be greatly increased.

The solvent may be any one selected from an alcohol such as ethanol, isopropyl alcohol, n-propyl alcohol, butyl alcohol or glycerol, water, dimethylacetamide, dimethylsulfoxide, dimethylformamide, N-methylpyrrolidone, tetrahydrofuran and a mixture thereof.

Useful methods of applying the composition for forming the interfacial bonding layer onto the electrolyte membrane 210 or the electrode 220 include slot die coating, bar coating, dip coating, comma coating, screen printing, spray coating, doctor blade coating, silk screen coating, gravure coating, painting and the like.

The drying process may be carried out at 25° C. to 90° C. for 12 hours or more. When the drying temperature is less than 25° C. and the drying time is less than 12 hours, the interfacial bonding layer 230 may not be sufficiently dried, and when drying is conducted at a temperature exceeding 90° C., the interfacial bonding layer may crack.

The thickness of the interfacial bonding layer 230 is 10 nm to 10 μm, preferably 0.5 μm to 2 μm, and the loading amount of the interfacial bonding layer 230 may be 0.01 mg/cm$^2$ to 2.0 mg/cm$^2$. When the thickness of the interfacial bonding layer 230 is less than 10 nm or the loading amount is less than 0.01 mg/cm$^2$, the effect of improving chemical durability may be insignificant, and the interfacial bonding property between the electrolyte membrane 210 and the electrode 220 may not be improved, and when the thickness exceeds 10 μm or the loading amount exceeds 2.0 mg/cm$^2$, ion transfer resistance in the membrane-electrode assembly 100 may be significantly increased.

Finally, the membrane-electrode assembly 100 is produced using the electrolyte membrane 210 or the electrode 220 including the interfacial bonding layer 230.

When the interfacial bonding layer 230 is formed on the electrode 220, the membrane-electrode assembly 100 may be produced by hot-pressing the electrolyte membrane 210 or the electrode 220, and when the interfacial bonding layer 230 is formed on the electrolyte membrane 210, the membrane-electrode assembly may be produced by hot-pressing the electrolyte membrane 210 and the electrode 220, or coating the electrode 220 on the electrolyte membrane 210.

The hot-pressing of the electrode 220 and the electrolyte membrane 210 performed via the interfacial bonding layer 230 may be performed under conditions of 80° C. to 2,000° C. and 5 kgf/cm$^2$ to 200 kgf/cm$^2$. When hot pressing is conducted at less than 80° C. or less than 50 kgf/cm$^2$, the transfer of the electrode 220 to a release film may not be properly performed, and when hot pressing is conducted at more than 200° C., there is a possibility of denaturation of the polymer of the electrolyte membrane 210, and when hot pressing is conducted at a temperature higher than 200 kgf/cm$^2$, the pore structure in the electrode 220 may break, thus deteriorating performance.

Meanwhile, some of the radical scavengers 100 present in the interfacial bonding layer 230 during the hot-pressing process are moved to the electrode 220 and/or the electrolyte membrane 210, so any one of the embodiments shown in FIG. 6(b) and FIG. 6(c) can be implemented.

According to the embodiment shown in FIG. 6(a), when the radicals generated in the electrode 220 move from the electrode 220 to the electrolyte membrane 210, they may be removed by the radical scavengers 100 of the present disclosure, thus preemptively preventing degradation of the polymer electrolyte membrane 210 due to radicals.

Various combinations of the embodiment of FIG. 5(a), the embodiment of FIG. 5(b) and the embodiment of FIG. 6(a) are shown in FIGS. 6(b) to 6(f), respectively. In addition, it should be understood that various combinations other than these combinations are also conceivable and also fall within the scope of the present disclosure.

Hereinafter, the present disclosure will be described in more detail with reference to specific examples. However, these examples are provided only for better understanding of the present disclosure and should not be construed as limiting the scope of the present disclosure.

Preparation Example 1: Radical Scavenger

Example 1-1

To a precursor solution containing 3% by weight of dicyandiamide in a methylpyrrolidone solvent, 2 parts by weight of $CeO_2$ nanoparticles were added with respect to 100 parts by weight of the solvent, and then the resulting mixture was stirred at 250 rpm at 25° C. for 10 hours. Subsequently, the reaction solution was centrifuged at 3,600 rpm and dried at 60° C. overnight to obtain $CeO_2$ nanoparticles having a dicyandiamide layer formed on the surface thereof.

The $CeO_2$ nanoparticles having a dicyandiamide layer formed on the surface thereof were heat-treated at 550° C. for 4 hours to convert the dicyandiamide layer into a g-$C_3N_4$ porous protective film to thereby obtain a radical scavenger. The radical scavenger was stirred in 1.5 M sulfuric acid at 80° C. to remove the impurities adsorbed on the g-$C_3N_4$ porous protective film. Then, the residue was rinsed several times with distilled water and dried to complete the radical scavenger. The obtained radical scavenger had the g-$C_3N_4$ porous protective film about 1 to about 1.5 nm thick.

Example 1-2

$CeO_2$ nanoparticles were added to a precursor solution containing 10% by weight of (3-mercaptopropyl)triethoxysilane in a mixed solvent of ethanol and water (injection amount: 2 parts by weight based on 100 parts by weight of the mixed solvent), and a hydrolysis reaction was performed while stirring at 250 rpm and 25° C. for 10 hours. As a result of the hydrolysis reaction, a silane layer was formed on the surface of the $CeO_2$ nanoparticles. Subsequently, the silane layer was centrifuged at 3,600 rpm, and the silane layer was converted into a silica porous protective film by condensation at 60° C. for 24 hours. Then, the result was rinsed several times with distilled water and dried to complete a radical scavenger. The thickness of the silica porous protective film of the obtained radical scavenger was about 1 nm.

Comparative Example 1-1

Dopamine was added to a tris-hydrochloric acid buffer solvent to prepare a composition for precursor coating, and $CeO_2$ nanoparticles were added to the composition for precursor coating. At this time, the composition for precursor coating contained 0.3 parts by weight of the dopamine with respect to 100 parts by weight of the $CeO_2$ nanoparticles.

The composition containing the $CeO_2$ nanoparticles was stirred at 250 rpm at 25° C. for 12 hours, and the precursor was stabilized at 250° C. under a nitrogen atmosphere.

Subsequently, the precursor coated on the surfaces of the $CeO_2$ nanoparticles was carbonized under a nitrogen atmosphere at 700° C. to form a porous carbon coating layer, and was sequentially subjected to acid cleaning, rinsing, and drying processes under the same conditions as in Example 1 to complete the radical scavenger. The thickness of the porous carbon coating layer of the obtained radical scavenger was 2 to 5 nm.

Production Example 2: Production of Membrane-Electrode Assembly

Example 2-1

In order to produce a polymer electrolyte membrane, sulfonated PAES was dissolved in DMAC at 10% by weight to prepare a composition for forming a polymer electrolyte membrane. The obtained composition for forming a polymer electrolyte membrane was applied onto a glass plate using a blade coating method and was then dried in an oven at 60° C. for 24 hours to produce a polymer electrolyte membrane.

The catalyst layer for the anode and the catalyst layer for the cathode were prepared by respective conventional methods.

Subsequently, a mixed solution containing a radical scavenger and a Nafion ionomer prepared in Example 1-1 in a solvent containing water and normal propane mixed at a ratio of 1:1 was prepared. At this time, the content of Nafion in the mixed solution was 5% by weight, and the ratio of the weight of the radical scavenger to the total weight of solids in the mixed solution was 7% by weight.

The mixed solution was applied to the catalyst layer for the anode and the catalyst layer for the cathode using spray coating, and was then dried to form an interfacial bonding layer having a mass per unit area of 0.2 to 0.3 mg/cm'. Subsequently, the catalyst layer for the anode and the catalyst layer for the cathode, each of which had the interfacial bonding layer formed on the surface thereof, were hot-pressed with the polymer electrolyte membrane to complete a membrane-electrode assembly.

Example 2-2

A membrane-electrode assembly was completed in the same manner as in Example 2-1, except that the radical scavenger prepared in Example 1-2 was used instead of the radical scavenger prepared in Example 1-1.

Comparative Example 2-1

A membrane-electrode assembly was completed in the same manner as in Example 2-1, except that the radical scavenger prepared in Comparative Example 1-1 was used instead of the radical scavenger prepared in Example 1-1.

[Evaluation of Membrane-Electrode Assembly]

The open-circuit voltage (OCV) retention rate and the electro-chemical surface area (ECSA) loss of the membrane-electrode assemblies prepared by Example 2-1 and Comparative Example 2-1 were measured by the following method.

*Open Circuit Voltage (OCV) Retention Rate (%)

Figure 7:
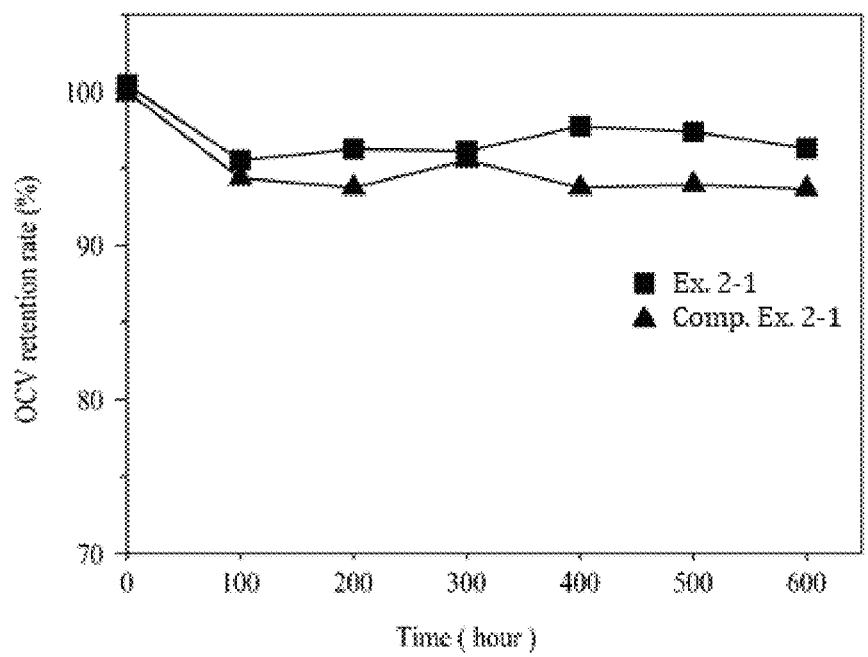
FIG. 7 is a graph showing an open circuit voltage (OCV) retention rate of each of Example 2-1 and Comparative Example 2-1.

In order to determine the radical removal activity of the membrane-electrode assembly, the membrane-electrode assembly was mounted on a device for evaluating a fuel-cell unit cell, hydrogen and air were respectively fed to the anode and the cathode at an equivalent weight ratio of 10 based on 0.2 $mA/cm^2$ at a temperature of 90° C. and a relative humidity of 50%, and the open circuit voltage retention rate was measured. FIG. 7 is a graph showing the open circuit voltage retention rates of Example 2-1 and Comparative Example 2-1. As can be seen from FIG. 7, the membrane-electrode assembly of Example 2-1, containing the radical scavenger having the g-$C_3N_4$ porous protective film of the present disclosure in an interfacial bonding layer, had a significantly higher OCV durability than the membrane-electrode assembly of Comparative Example 2-1 containing the radical scavenger having the porous coating film in the interfacial bonding layer.

*Electrochemical Active Area Loss (ECSA Loss) (%)

Figure 8:
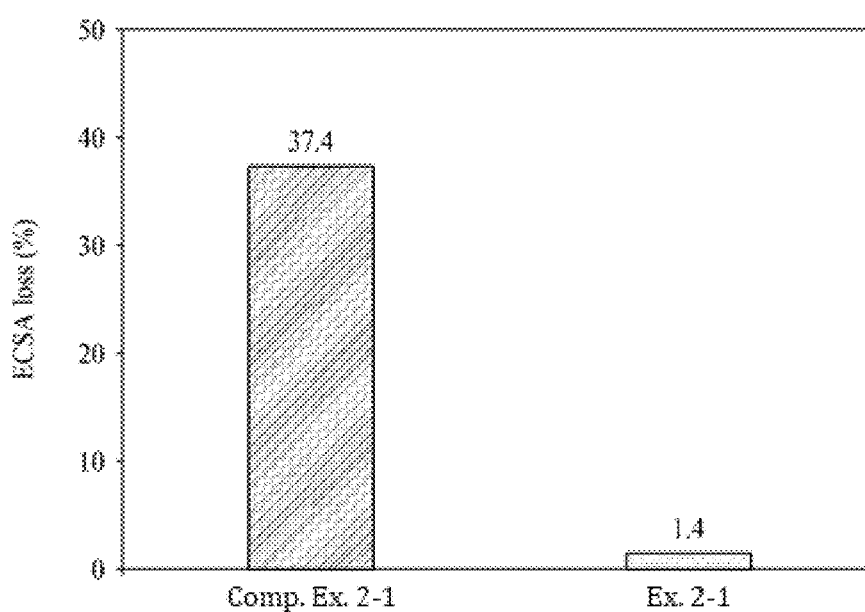
FIG. 8 is a graph showing an electrochemical surface area (ECSA) loss of each of Example 2-1 and Comparative Example 2-1.

In order to determine the degree of degradation of the catalyst layer of the membrane-electrode assembly, the electrochemical active area (ECSA) before and after measurement (600 hours) of the open circuit voltage retention rate was measured using cyclic voltammetry (scan speed: 50 mV/s, scan range: 0.05-0.9 V), and the loss rate was calculated. FIG. 8 is a graph showing the electrochemical active area loss of Example 2-1 and Comparative Example 2-1. As can be seen from FIG. 8, the ECSA loss of the membrane-electrode assembly of Example 2-1 (1.4%) was much smaller than the ECSA loss of the membrane-electrode assembly of Comparative Example 2-1 (ECSA loss=37.4%). That is, the g-$C_3N_4$ porous protective film of the present disclosure can more effectively prevent degradation of the catalyst layer by suppressing the migration of metal ions ($Ce^{3+/4+}$) more effectively than the porous carbon coating layer derived from dopamine.

[Evaluation of Ce-Ion Migration Amount of Radical Scavenger]

Figure 9:
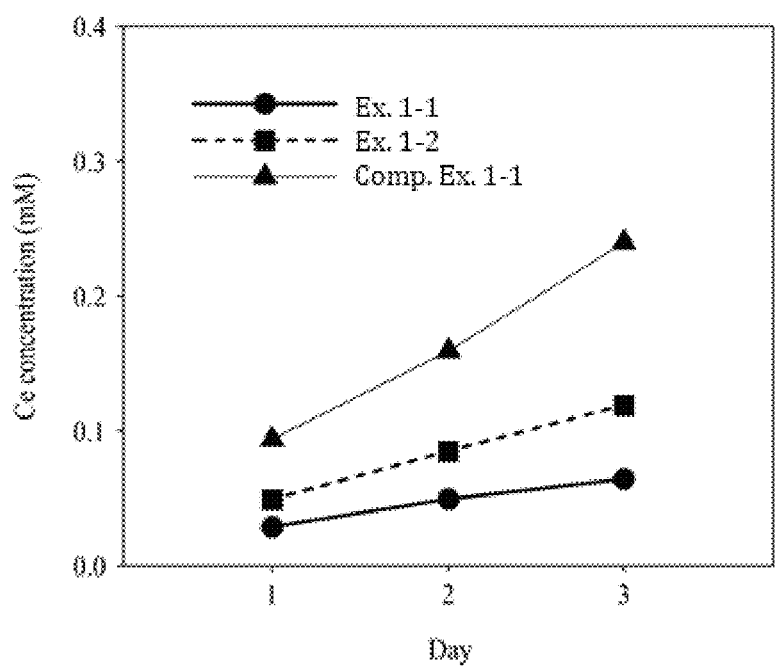
FIG. 9 is a graph showing Ce ion migration amounts of the radical scavengers of each of Example 1-1, Example 1-2 and Comparative Example 1-1.

In Order to Evaluate the Performance of Inhibiting the Ce Ion Migration of the radical scavengers of Example 1-1, Example 1-2 and Comparative Example 1-1, the Ce ion migration amount was measured three times over three days at intervals of one day. Specifically, 20 mg of a radical scavenger was added to 10 mL of a 0.5 M sulfuric acid solution, followed by stirring at 80° C. at a speed of 250 rpm. A solution sample was extracted by centrifugation (3,600 rpm, 5 minutes), and then the amount of Ce ions (i.e., the amount of migration) in the solution sample was measured using UV-Vis spectroscopy. For subsequent measurements on the next day, after the sample extraction of the solution, the immersed solid particles were added again to a fresh 0.5 M sulfuric acid solution and stirred at 80° C. to induce the migration of Ce ions. Here, the extracted solution sample was subjected to UV-Vis spectroscopy at 1 nm intervals in the wavelength range of 200 to 600 nm. FIG. 9 is a graph showing Ce ion migration amounts of the radical scavengers of Example 1-1, Example 1-2 and Comparative Example 1-1. As can be seen from FIG. 9, unlike the porous carbon coating layer derived from dopamine, the g-$C_3N_4$ porous protective film and the silica porous protective film of the present disclosure exhibited an excellent effect of inhibiting Ce ion migration.

The invention claimed is:

1. A radical scavenger capable of removing hydroxyl radicals generated during an operation of a fuel cell, the radical scavenger comprising:
   a radical-scavenging particle; and
   a porous protective film over a surface of the radical-scavenging particle,
   wherein the porous protective film comprises at least one material of high oxidative stability selected from the group consisting of silica, carbon nitride, heteroatom-doped graphene, a porphyrin-based compound, a phenazine-based compound and derivatives thereof, wherein the heteroatom is selected from the group consisting of N, S, P, B and F, wherein the radical-scavenging particle comprises Ce, a salt thereof, an oxide thereof, a nitride thereof, or a complex thereof, wherein the porous protective film has a thickness of 0.5 to 50 nm, and wherein an average pore diameter of the porous protective film is larger than 0.22 nm and smaller than 0.45 nm such that the porous protective film allows the hydroxyl radicals to pass therethrough but prevents Ce ions from passing therethrough.

2. The radical scavenger according to claim 1, wherein the porous protective film comprises carbon nitride or a derivative thereof.

3. The radical scavenger according to claim 2, wherein the porous protective film comprises graphitic carbon nitride or a derivative thereof, and wherein the graphitic carbon nitride is $g\text{-}C_3N_4$ or $g\text{-}C_2N$.

4. A method for manufacturing a radical scavenger capable of removing hydroxyl radicals generated during an operation of a fuel cell, the method comprising:

forming a precursor layer comprising at least one precursor selected from the group consisting of a silica precursor and a carbon nitride precursor over a surface of a radical-scavenging particle; and converting the precursor layer into a porous protective film, wherein the radical-scavenging particle comprises Ce, a salt thereof, an oxide thereof, a nitride thereof, or a complex thereof, wherein the porous protective film has a thickness of 0.5 to 50 nm, and wherein an average pore diameter of the porous protective film is larger than 0.22 nm and smaller than 0.45 nm such that the porous protective film allows the hydroxyl radicals to pass therethrough but prevents Ce ions from passing therethrough.

5. The method according to claim 4, wherein the precursor layer comprises at least one silica precursor selected from the group consisting of tetraethyl orthosilicate, tetramethoxysilane, (3-mercaptopropyl)triethoxysilane, and silicon tetrachloride.

6. The method according to claim 4, wherein the precursor layer comprises at least one carbon nitride precursor selected from the group consisting of cyanamide, dicyandiamide, urea, melamine, polymelamine and a polymelamine-formaldehyde copolymer.

7. The method according to claim 6, wherein the precursor layer comprises dicyandiamide.

8. The method according to claim 4, wherein the forming the precursor layer comprises:

preparing a precursor solution comprising the at least one precursor selected from the group consisting of a silica precursor and a carbon nitride precursor;

applying the precursor solution to the surface of the radical-scavenging particle; and removing a solvent from the precursor solution applied to the surface of the radical-scavenging particle.

9. The method according to claim 8, wherein the precursor solution comprises at least one solvent selected from the group consisting of water, cyclohexane, hexane, dimethylacetamide (DMA), dimethyl sulfoxide (DMSO), dimethylformamide (DMF), and methylpyrrolidone.

10. The method according to claim 9, wherein the applying comprises:

submerging the radical-scavenging particle in the precursor solution;

stirring the precursor solution containing the radical-scavenging particle; and then, performing centrifugation.

11. The method according to claim 10, wherein the removing the solvent comprises drying the precursor solution applied to the surface of the radical-scavenging particle.

12. The method according to claim 4, wherein the converting the precursor layer into the porous protective layer comprises heat-treating the precursor layer.

13. A membrane-electrode assembly comprising:

an anode;

a cathode;

a polymer electrolyte membrane between the anode and the cathode; and the radical scavengers according to claim 1.

14. The membrane-electrode assembly according to claim 13, wherein at least a portion of the radical scavengers are disposed (i) inside the anode at a surface of the anode facing the polymer electrolyte membrane, (ii) inside the cathode at a surface of the cathode facing the polymer electrolyte membrane, (iii) inside the polymer electrolyte membrane at a surface of the polymer electrolyte membrane facing the anode, (iv) inside the polymer electrolyte membrane at a surface of the polymer electrolyte membrane facing the cathode, (v) between the anode and the polymer electrolyte membrane, or (vi) between the cathode and the polymer electrolyte membrane.

15. The membrane-electrode assembly according to claim 14, further comprising an interfacial bonding layer between the anode and the polymer electrolyte membrane, wherein the at least a portion of the radical scavengers are disposed in the interfacial bonding layer.

16. The membrane-electrode assembly according to claim 14, further comprising an interfacial bonding layer between the cathode and the polymer electrolyte membrane, wherein the at least a portion of the radical scavengers are disposed in the interfacial bonding layer.

* * * * *